United States Patent
Kabos et al.

(10) Patent No.: US 11,052,944 B2
(45) Date of Patent: Jul. 6, 2021

(54) AUTO DOCKING METHOD FOR APPLICATION IN HEAVY TRUCKS

(71) Applicant: DAF Trucks N.V., Eindhoven (NL)

(72) Inventors: Thierry Kabos, Eindhoven (NL); Rudolf Geert Maria Huisman, Helmond (NL); Albertus Clemens Maria Van Der Knaap, Helmond (NL)

(73) Assignee: DAF Trucks N.V., Eindhoven (NL)

( * ) Notice: Subject to any disclaimer, the term of this patent is extended or adjusted under 35 U.S.C. 154(b) by 98 days.

(21) Appl. No.: 15/778,020

(22) PCT Filed: Nov. 23, 2016

(86) PCT No.: PCT/NL2016/050820
§ 371 (c)(1),
(2) Date: May 22, 2018

(87) PCT Pub. No.: WO2017/091066
PCT Pub. Date: Jun. 1, 2017

(65) Prior Publication Data
US 2018/0346029 A1    Dec. 6, 2018

(30) Foreign Application Priority Data
Nov. 23, 2015 (NL) ........................... 2015843

(51) Int. Cl.
*B62D 15/02* (2006.01)
*B60T 7/18* (2006.01)
(Continued)

(52) U.S. Cl.
CPC ............ *B62D 15/0285* (2013.01); *B60T 7/18* (2013.01); *B62D 15/027* (2013.01);
(Continued)

(58) Field of Classification Search
CPC .......................... B62D 15/0285; B62D 15/027; B62D 15/029; B60T 7/18; B60T 2201/10;
(Continued)

(56) References Cited

U.S. PATENT DOCUMENTS 3,061,855 A * 11/1962 Layne ................. B65G 69/2841
14/71.3
4,646,075 A * 2/1987 Andrews ................. G06T 15/30
345/440
(Continued)

FOREIGN PATENT DOCUMENTS

| CN | 101772446 B * | 7/2013 | ......... B62D 15/0285 |
| CN | 103576134 A * | 2/2014 | |

(Continued)

OTHER PUBLICATIONS

Nov. 14, 2014—Michalek, Maciej "The concept of passive control-assistance for docking maneuvers with N-trailer vehicles" vol. 20, Issue 5.

(Continued)

*Primary Examiner* — Behrang Badii
*Assistant Examiner* — Jalal C Coduroglu
(74) *Attorney, Agent, or Firm* — Banner & Witcoff, Ltd.

(57) ABSTRACT

It is aimed to provide a method for guiding of a motor vehicle on the basis of image data, particularly when manoeuvring trucks toward docking stations by a docking controller coupled to a steering system, comprising: identifying, by the docking controller the vehicle's current position; receiving a collision free path; and manoeuvring the vehicle by said docking controller according to said free path, wherein the vehicle's current position is identified by means of an off board vehicle scanner that is mounted in a fixed position relative to the dock station; wherein said vehicle scanner produces scan data signifying a set that are (Continued)

analyzed to identify a reference point of the vehicle and a vehicle's orientation; wherein said reference point and vehicle orientation are transmitted to the docking controller to update the vehicle's current position.

14 Claims, 7 Drawing Sheets (51) Int. Cl.
G05D 1/02 (2020.01)
G01S 17/42 (2006.01)
G08G 1/16 (2006.01)

(52) U.S. Cl.
CPC ............ B62D 15/029 (2013.01); G01S 17/42 (2013.01); G05D 1/024 (2013.01); G05D 1/028 (2013.01); G05D 1/0225 (2013.01); B60T 2201/10 (2013.01); G05D 2201/0213 (2013.01); G08G 1/168 (2013.01)

(58) Field of Classification Search
CPC ...... G01S 17/42; G05D 1/0225; G05D 1/024; G05D 1/028; G05D 2201/0213; G08G 1/16
See application file for complete search history.

(56) References Cited

U.S. PATENT DOCUMENTS

| | | | |
|---|---|---|---|
| 5,663,879 A | 9/1997 | Trovato et al. | |
| 6,405,132 B1* | 6/2002 | Breed | G01S 7/4802 |
| | | | 701/301 |
| 6,677,889 B2* | 1/2004 | Van Rees | G05D 1/0206 |
| | | | 342/41 |
| 6,965,816 B2* | 11/2005 | Walker | B64C 13/20 |
| | | | 701/16 |
| 7,085,637 B2* | 8/2006 | Breed | B60W 30/04 |
| | | | 701/38 |
| 7,313,467 B2* | 12/2007 | Breed | G07C 5/008 |
| | | | 307/9.1 |
| 7,444,210 B2* | 10/2008 | Breed | G07C 5/008 |
| | | | 307/9.1 |
| 7,527,288 B2* | 5/2009 | Breed | B60R 21/013 |
| | | | 280/735 |
| 8,047,149 B1* | 11/2011 | Antonelli | G01S 1/70 |
| | | | 114/230.1 |
| 8,314,732 B2* | 11/2012 | Oswald | G01S 7/415 |
| | | | 342/90 |
| 8,576,235 B1* | 11/2013 | Sumner | G06T 15/20 |
| | | | 345/474 |
| 8,798,957 B2* | 8/2014 | Feiten | G01S 5/16 |
| | | | 702/150 |
| 9,008,369 B2* | 4/2015 | Schofield | B60W 30/143 |
| | | | 382/104 |
| 9,290,202 B2* | 3/2016 | Lavoie | B62D 13/06 |
| 9,500,497 B2* | 11/2016 | Lavoie | B60K 37/06 |
| 9,506,774 B2* | 11/2016 | Shutko | B60W 30/06 |
| 9,609,289 B2* | 3/2017 | Schofield | G06K 9/00798 |
| 9,683,848 B2* | 6/2017 | Lavoie | B60W 30/18036 |
| 9,697,730 B2* | 7/2017 | Thakur | B62D 15/0285 |
| 9,708,000 B2* | 7/2017 | Hafner | B62D 13/06 |
| 9,854,209 B2* | 12/2017 | Aich | B60W 10/18 |
| 9,926,008 B2* | 3/2018 | Hafner | B60D 1/62 |
| 9,948,904 B2* | 4/2018 | Schofield | B60R 1/00 |
| 9,969,428 B2* | 5/2018 | Hafner | G08G 1/14 |
| 10,035,457 B2* | 7/2018 | Singh | B62D 15/0265 |
| 10,160,382 B2* | 12/2018 | Pliefke | B62D 13/06 |
| 10,173,722 B2* | 1/2019 | Pourrezaei Khaligh | |
| | | | B62D 13/025 |
| 10,196,088 B2* | 2/2019 | Lavoie | G06K 9/3216 |
| 10,306,190 B1* | 5/2019 | Schofield | H04N 7/18 |
| 10,471,992 B2* | 11/2019 | Brennan | B62D 15/021 |
| 10,514,700 B2* | 12/2019 | Cantrell | G05D 1/0088 |
| 2006/0269896 A1* | 11/2006 | Liu | A61C 7/00 |
| | | | 433/29 |
| 2009/0040095 A1 | 2/2009 | Ogawa | |
| 2012/0139325 A1* | 6/2012 | Norberg | G06N 20/10 |
| | | | 299/10 |
| 2013/0080044 A1* | 3/2013 | Tyers | G08G 3/02 |
| | | | 701/301 |
| 2015/0256034 A1* | 9/2015 | Stone | H02J 50/30 |
| | | | 307/9.1 |
| 2015/0291179 A1* | 10/2015 | Tagesson | B62D 15/027 |
| | | | 702/158 |
| 2016/0292872 A1* | 10/2016 | Hammond | G01S 17/933 |
| 2018/0197139 A1* | 7/2018 | Hill | G06Q 10/0832 |
| 2018/0346029 A1* | 12/2018 | Kabos | B62D 15/027 |
| 2018/0364738 A1* | 12/2018 | Bridges | G05D 1/0287 |
| 2019/0039425 A1* | 2/2019 | Dodd | B60D 1/015 |
| 2019/0343429 A1* | 11/2019 | Elhawary | A61B 5/1126 |

FOREIGN PATENT DOCUMENTS

| | | | | |
|---|---|---|---|---|
| DE | 102004047214 A1 | 3/2006 | | |
| DE | 102005036794 A1 | 2/2007 | | |
| DE | 102012016980 A1 | 2/2013 | | |
| EP | 1559629 A1 | 8/2005 | | |
| EP | 2373558 A1 | 10/2011 | | |
| EP | 2634071 B1 * | 1/2015 | ......... B62D 15/0285 |
| FR | 2979461 A1 | 3/2013 | | |
| KR | 200358758 Y1 * | 8/2004 | | |
| KR | 200374351 Y1 * | 1/2005 | | |
| WO | WO-03029922 A2 * | 4/2003 | ............ B64C 13/20 |
| WO | WO-2008080211 A1 * | 7/2008 | .......... G01D 5/3473 |
| WO | 2010064989 A1 | 6/2010 | | |
| WO | WO-2014185828 A1 * | 11/2014 | ............ G08G 1/168 |
| WO | WO-2017091066 A1 * | 6/2017 | ......... B62D 15/0285 |

OTHER PUBLICATIONS

1995—Svestka "Exact Motion Planning TractorTrailer Robots" IEEE International Conference on Robotics and Automation Robotics and Automation vol. 3.
Feb. 24, 2017—ISR and WO—PCT/NI2016/050820.

* cited by examiner

AUTO DOCKING METHOD FOR APPLICATION IN HEAVY TRUCKS

CROSS-REFERENCE TO RELATED APPLICATIONS

This application is a U.S. National Stage application under 35 U.S.C. § 371 of International Application PCT/NL2016/050820 (published as WO 2017/091066 A1), filed Nov. 23, 2016 which claims the benefit of priority to Application NL 2015843, filed Nov. 23, 2015. Benefit of the filing date of each of these prior applications is hereby claimed. Each of these prior applications is hereby incorporated by reference in its entirety.

FIELD OF INVENTION

The invention relates to a method of automatic docking of a vehicle, in particular of a trailer truck combination.

DESCRIPTION OF THE PRIOR ART

State of the art heavy trucks today are equipped with steering systems, mainly based on hydraulic boosting in a fixed "passive" manner. Newest trends however are the introduction of an electromotor (either as add-on system or even as full replacement of the hydraulic system) that engages the wheels and supports the steering wheel movements. These electric steering system all have in common that they need an ECU based control system with sensors. Moreover, mostly CAN interfaces are provided to connect them to other vehicle control systems. Such active steering systems may also be used to implement Advanced Driver Assistance Systems, that may be used to interact with the driver, aid him in traffic situations, and even facilitate autonomous driving. A major challenge is to provide driver assistance, or even autonomous driving support for docking a trailer—i.e. driving in reverse to park a trailer against a dock for loading and unloading of the trailer, greatly relieving the burden for the driver in this highly precise low speed maneuvering task (with reduced vision at the target) on the one hand and increasing the efficiency of these logistic activity (as part of daily operation at the warehouse system) on the other hand One of the many challenges is the limited room for maneuvering in typical docks, where a trailer has to drive in reverse in a straight line without a possibility of small adjustments, especially for fixed rear axle arrangements.

However, while these systems are beginning to surface in personal vehicles, in truck vehicles, in particular of the type of more than 6 tonnes, there is a considerable challenge for dimensioning these systems, in view of the difficulty of driving in reverse with a trailer combination.

In other prior art systems, e.g. DE102004047214 it is contemplated to determine a position of a transport vehicle and analyzing a scene. Destination objects and free spaces are identified in the scene. An associated docking vector is calculated from a preset position of the vehicle to the objects. A route for the objects is planned and a three- or two-dimensional characteristics of the identified object are recorded to obtain a new position information of the vehicle during a journey. In the DE'214 a substantial effort is necessary to analyze a complex 3D scene, which is less optimal also because the analysis requires constant updating and adaptation when the vehicle is in motion and a precise known vehicle location is necessary to perform a docking maneuver. Michalek, in "The concept of passive control-assistance for docking maneuvers with N-trailer vehicles" Mechatronics, IEEE/ASME IEEE/ASME Transactions on Mechatronics (10 Nov. 2014, Volume:20, Issue: 5) describes an advanced control algorithm for active or passive control assistance, building on a earlier concepts such as described in "Exact Motion Planning for Tractor-Trailer Robots" IEEE International Conference on Robotics and Automation Robotics and Automation, Proceedings 1995 (Svestka, Vleugels, Volume:3). The authors focus on path solutions that can be planned. However a reliable match with the surroundings in an actual set up is not contemplated. There is a need to provide a reliable method for autonomously docking a trailer truck combination in a practical set up. Furthermore an efficient computing algorithm for localization of the back of the trailer with respect to the dock is needed that minimizes the load on the controller.

SUMMARY OF THE INVENTION

It is aimed to provide a method for guiding of a motor vehicle on the basis of image data, particularly when manoeuvring trucks toward docking stations by a docking controller coupled to a steering system, comprising: identifying, by the docking controller the vehicle's current position; receiving a collision free path; and manoeuvring the vehicle by said docking controller according to said free path, wherein the vehicle's current position is identified by means of an off board vehicle scanner that is mounted in a fixed position relative to the dock station; wherein said vehicle scanner produces scan data signifying a set that are analyzed to identify a reference point of the vehicle and a vehicle's orientation; wherein said reference point and vehicle orientation are transmitted to the docking controller to update the vehicle's current position.

BRIEF DESCRIPTION OF THE DRAWINGS

The invention will be further elucidated in the figures.

DETAILED DESCRIPTION

Unless otherwise defined, all terms (including technical and scientific terms) used herein have the same meaning as commonly understood by one of ordinary skill in the art to which this disclosure belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

The term "controller" is used in a conventional way to signify any structural hardware or software arrangement having a capability of executing program logic in order to provide a certain basic function. A skilled person is typically aware of how to operate or implement a circuit in the context of the description, with processor elements elucidated here below. For example, a 'docking controller' comprises hard/ and or software elements dedicated to the purpose, as further illustrated here below, of identifying a truck's current position.

The term "program logic" is used in a conventional way to signify the operating instructions, which may be embodied in hard- or software structures, that control a circuit to the designated functional behavior.

The term "signal line" is used in a conventional way to signify an information exchanged via signal transmission, which may be in the form of coded signals, in analog or digital fashion by any conventional communication device, where it is not excluded that other signal lines are available, but merely to signify that a certain connectivity is available. This may also indicate indirect connectivity, that is, a signal line may be provided by indirect signaling, for example, via another functional device.

The term "user interface" may comprise one or more hardware elements configured to perform operational acts in accordance with the present systems and methods, such as to provide control signals to the various other module components. The processor may be a dedicated processor for performing in accordance with the present system or may be a general-purpose processor wherein only one of many functions operate for performing in accordance with the present system. The processor may operate utilizing a program portion, multiple program segments, or may be a hardware device utilizing a dedicated or multi-purpose integrated circuit. Any type of processor may be used such as a dedicated or shared one. The processor may include microcontrollers, central processing units (CPUs), digital signal processors (DSPs), ASICs, or any other processor(s) or controller(s) such as digital optical devices, or analog electrical circuits that perform the same functions, and employ electronic techniques and architecture. The controller or processor may further comprise a memory that may be part of or operationally coupled to the controller. The memory may be any suitable type of memory where data is stored. Any medium known or developed that can store and/or transmit information suitable for use with the present systems and methods may be used as a memory. The memory may also store user preferences and/or application data accessible by the controller for configuring it to perform operational acts in accordance with the present systems and methods.

While example embodiments are shown for systems and methods, also alternative ways may be envisaged by those skilled in the art having the benefit of the present disclosure for achieving a similar function and result. E.g. some components may be combined or split up into one or more alternative components. Finally, these embodiments are intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as set forth in the claims that follow. The specification and drawings are accordingly to be regarded in an illustrative manner and are not intended to limit the scope of the appended claims.

Figure 1:
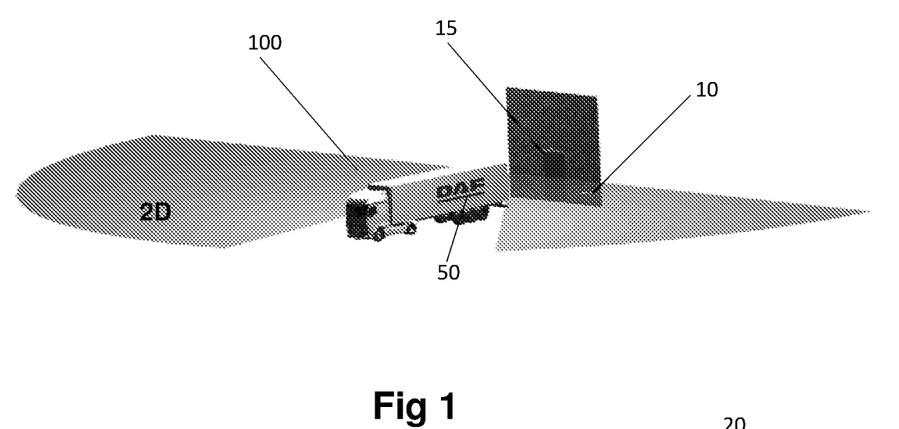
FIG. 1 and FIG. 2 show generic setups of embodiments according to the invention having a 2D or 3D vehicle scanner.
Figure 2:
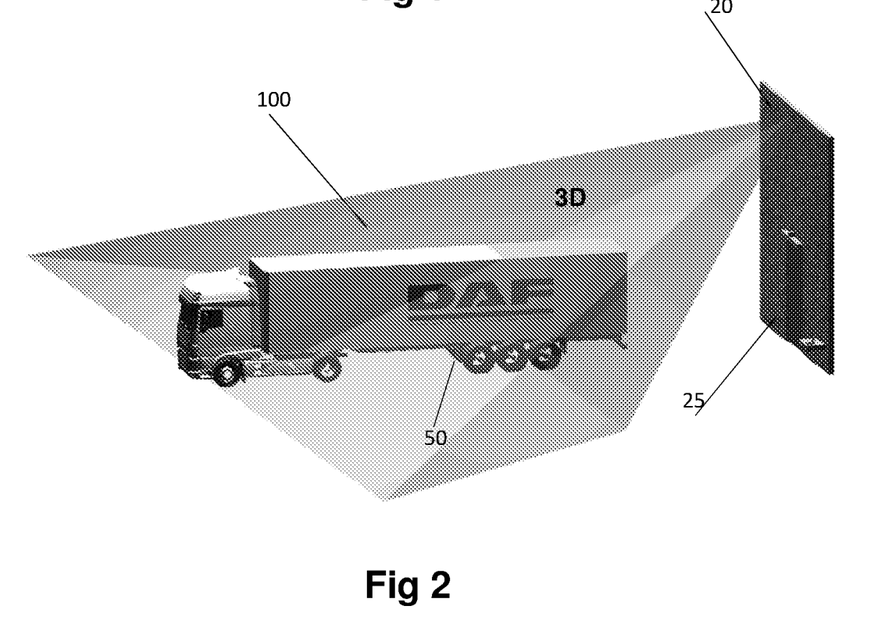

FIG. 1 and FIG. 2 show generic setups of embodiments according to the invention, wherein a truck's 100 current position is identified by means of an off board vehicle scanner 10, 20 that is mounted in a fixed position relative to the dock station 15, 25. In FIG. 1 the embodiment is a 2D scanner 10, which has the advantage of less expensive equipment and less intensive data processing. The 3D scanner 20 in FIG. 2 has as benefit that the truck and relevant orientation is visible at all times. It is noted that such 2D or 3D scanners are known per se and are here by way of example denoted as 'vehicle scanners' indicating their function for scanning and identifying a vehicle in the scan data set. The vehicle scanners are preferably of a laser scanning type, but may also be provided by different means, e.g. acoustic, or by means of camera's equipped with object recognition software. A laser scanner typically has a resolution of less than 10 cm, or even less than 5 cm, which is an important advantage for exact docking of the truck, in particular, the trailer 50.

The 2D or 3D vehicle scanner 10, 20 produce scan data 2D, 3D formed by sets of reflection angles and corresponding reflection distances. The scan data, signifying a set of laser reflections (2D or 3D angle and reflection distance) are analyzed to identify at least a reference point of the trailer and a trailer's orientation. The reference point and trailer's orientation are transmitted to the docking controller to update the truck's current position, and feeding the docking controller with the reference point and trailer orientation. The docking controller can be embodied in software and/or hardware and can be on-board or off board of the truck. It calculates the vehicle steering and driving parameters, necessary to steer and drive the vehicle to the docking controller's instructions i.e. according to a collision free path that docks the vehicle in a designated vehicle dock.

Figure 3:
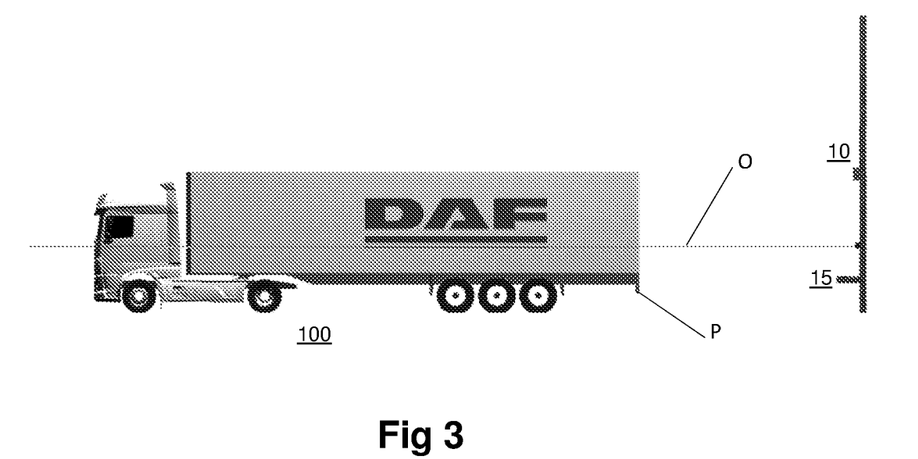
FIG. 3 shows a trailer truck combination identified by the vehicle scanner.

FIG. 3 show the truck 100 identified by the scanner 10, wherein a trailer orientation O is provided and a trailer reference point P. While the orientation O preferably coincides with the trailer's length axis and the trailer's reference point P with a trailers corner point, in particular, a trailer's rear corner point, this is not necessarily the case, and may be a combination of such, for example, orthogonal to the length axis, or aligned with a steering axle, where the reference point may be a steering axle or rear wheel.

Figure 4:
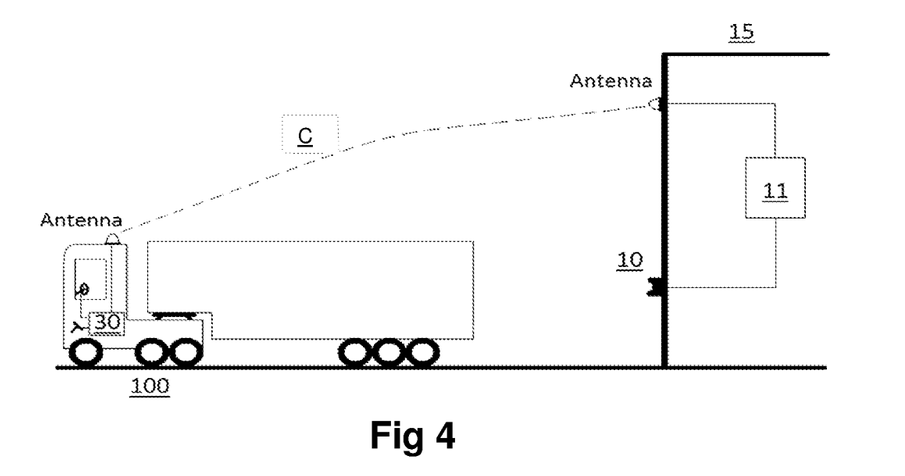
FIG. 4 shows a trailer truck combination in a wireless communication environment.

FIG. 4 shows a further embodiment. While the docking controller 30 may communicate in one sided communication with the vehicle scanner 10 with signal lines C establishing preferably a wireless communication preferably a two way communication is established e.g. via wifi, to communicate with a dock side processing system. The docking controller 30 can be wirelessly connected to a ware house control system 11 controlling said vehicle scanner. This ware house control system can be arranged to compute a collision free path and timing control of the truck to automously drive the truck along said collision free path according to said timing control. However, also on board controllers may be used for computing said collision free path, or a combination of both.

Figure 5A:
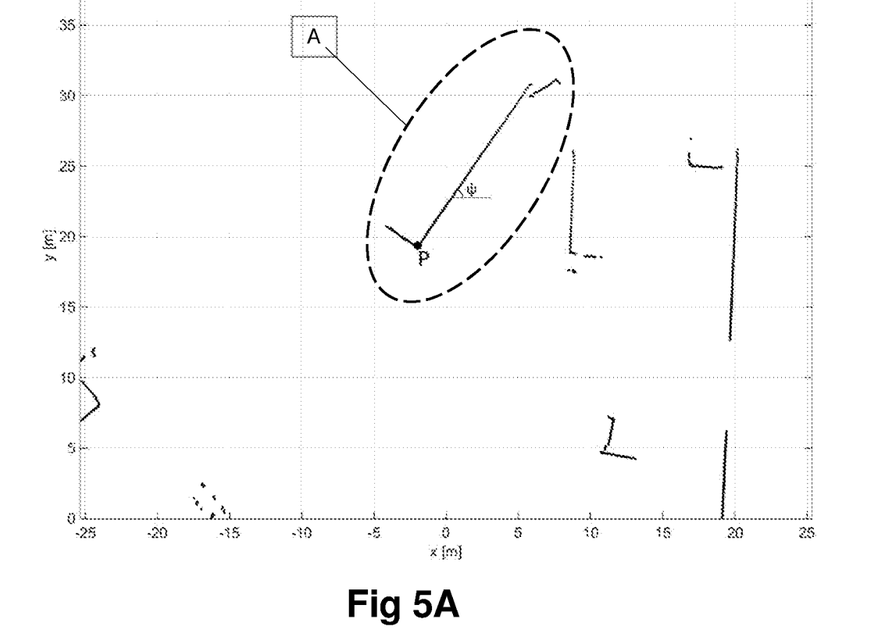
FIG. 5A shows an exemplary scan plot of a scan of a vehicle scanner according to the present invention.

Advantageously, the reference point P is identified from a scanner plot, as shown in FIG. 5a showing a scanner plot, wherein a rear corner point P is indicated in the plot for intelligibility purpose. The scanner plot is acquired by means of an off board 2D or 3D vehicle scanner that is mounted in a fixed position relative to a dock station for docking trailer trucks. The vehicle scanner accordingly produces scan data signifying a set that can be analysed to identify a rear corner point of the trailer and a trailer's orientation. For control in the auto docking system of the present invention, the steering controller is provided with the detected rear corner point position P of the trailer relative to the dock. Since there are no sensors that can measure this desired feature directly, they have to be derived from other sensor data, such as the output of a laser scanner. In particular, the truck's current position is identified by means of a vehicle scanner that produces scan data for example in the form as illustrated in FIG. 1. The scanner is mounted in a fixed position relative to the dock station. The vehicle scanner produces scan data that are analyzed to identify the rear corner point of the trailer and said rear corner point is transmitted (for instance via WiFi) to the steering controller to update the truck's current position. Please note that at the ECU 11, located at the dock first a geometric conversion from reference point P (rear corner point) the middle of the axle A is calculated before communicating to the auto-docking control ECU on board of the truck. For reference see also FIG. 10.

Furthermore, optionally, the reference point may be calculated or validated, e.g. by Kalman type filtering, from other sensors, e.g. in areas where the scanner cannot look. E.g. when the trailer approaches the final distance to the dock, the reference position can be further measured by conventional means, e.g. on-board parking sensors, ABS encoders and accelerators. These additional sensors can also be used to optimize the driver interaction; e.g. by smoothen the accelerations or steering action according to preset constraints. The information obtained from the laser scanner is a distance at which every beam in the laser's viewing area reflects. Since the angle of each beam is known, this data in polar coordinates can be converted to a set of points in the (x,y)-plane, where the laser scanner is at the origin, as shown in FIG. 5A. To obtain the required information for control, the processing algorithm then finds the trailer in this set of points, i.e. obtain the location of a corner of the trailer (point P) and the trailer orientation angle w.r.t. the dock,ψ.

To find the position and heading of the trailer, first the set of points actually belonging to this object (refer to area of interest A) is filtered out from the remaining data. When multiple trucks and trailers can be present in the environment, the analysis starts an approximate truck's position, such that the correct vehicle can be tracked. In particular, scan data is prefiltered by the controller to identify an approximate vehicle trailer position from a prefiltered data set. This can for instance be done by a signaler that signals the trucks position and is in connection with the steering controller, e.g. by it's GPS coordinates or from a marker signal that may be derived from the sensor data. For example, said prefiltering is provided by matching said scan data with a truck's GPS coordinate provided by the truck's GPS detector. Said GPS data are transmitted by the docking controller 15 to the off board vehicle scanner 10 and a dock side engine control unit processor 11 that processes the scanner data. Parts of the processing can be exchanged between the dock side processor 11 and the docking controller 30.

Once the trailer is identified by vehicle scanner 10 and/or corresponding processing in the dockside processor 11, it can be locked, by successive analysis of capture frames, and only selecting points that match a predetermined constraint derived from the instantaneous vehicle movement; so that the trailer is locked in. Using this initial estimate of the position, a set of points can be filtered out in a box surrounding this position, with a size based on the accuracy of the estimate. In addition, to filter out the tractor or possibly other nearby objects, one can make use of the knowledge that the laser scanner scans in one direction and thus fills the array of points from left to right or right to left. This means that measurements of the same solid object are in adjacent positions in the array of points. In between different objects, when there is a gap of sufficient size, several beams will not reflect back, enabling the algorithm to identify where the set of points belonging to the trailer ends. When tracking the truck in consecutive frames, the center position from the previous frame can be used as estimate for the initial filtering step.

Figure 5B:
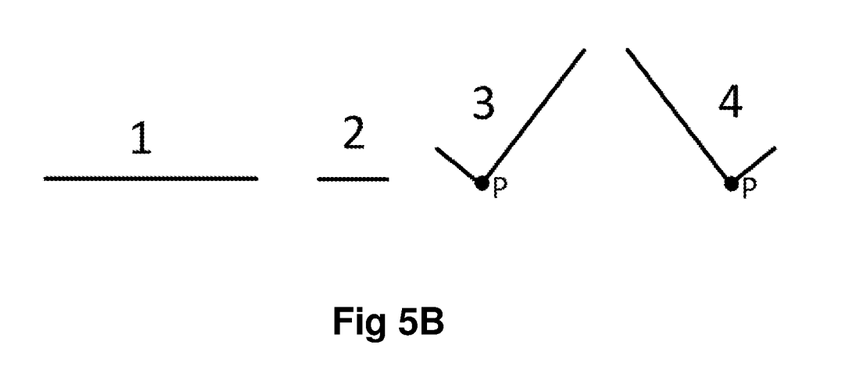
FIG. 5B shows a number of visibility scenario's.

Thus, the scan data is prefiltered by the controller to identify an approximate vehicle trailer position from a prefiltered data set. The controller matches a found vehicle trailer to one of a number of visibility scenario's wherein one or more vehicle trailer sides are visible by fitting a line through the data, or if a certain error level is exceeded, computing the location of a corner point and fitting a line through the datapoints for each of the two visible sides. Thus, after a correct set of points is obtained, the controller determines from the prefiltered data a single set of data points forming a corresponding line segment; or, when an error level is exceeded, multiple sets of data points forming multiple corresponding line segments belonging to multiple mean values. The algorithm interprets the remaining points to identify which part of the trailer is visible, and what way the trailer is facing, thus, the sets of data points are matched to one of a number of visibility scenario's wherein one or more vehicle trailer sides are visible. For example, using a two-dimensional laser scanner, at most two sides of the trailer can be visible, resulting in four different visibility scenarios, as is depicted in FIG. 5B. This is, assuming that the trailer is closed, or filled with cargo such that the laser scanner cannot look into the trailer. Note a "closed" trailer is not a prerequisite of the proposed localization technique. In the basis also other scanned geometric forms can be identified using a similar slightly modified algorithm. Via the proposed WiFi communication important geometric and other trailer information can advantageously be provided to the docking algorithm. For a regular rectangular trailer, the laser scanner can see either a long side (case 1), a short side (case 2) or both the long and short sides (case 3, resp. case 4) of the trailer. When two sides are visible, one has to distinguish whether the long side is on the left or on the right (i.e. distinguish from case 3 and 4). This can be done by tracking a line segment along the frames; and calculating for both sides a longest line segment; based on visible lines and a derived trailer orientation. The corner point P and actual vehicle position can subsequently be derived by matching said orthogonal directions with a visibility scenario of the trailer; one of which scenario's is chosen as an optimal scenario for identifying the trailers corner point; wherein the corner point is derived from a match.

Figure 6A:
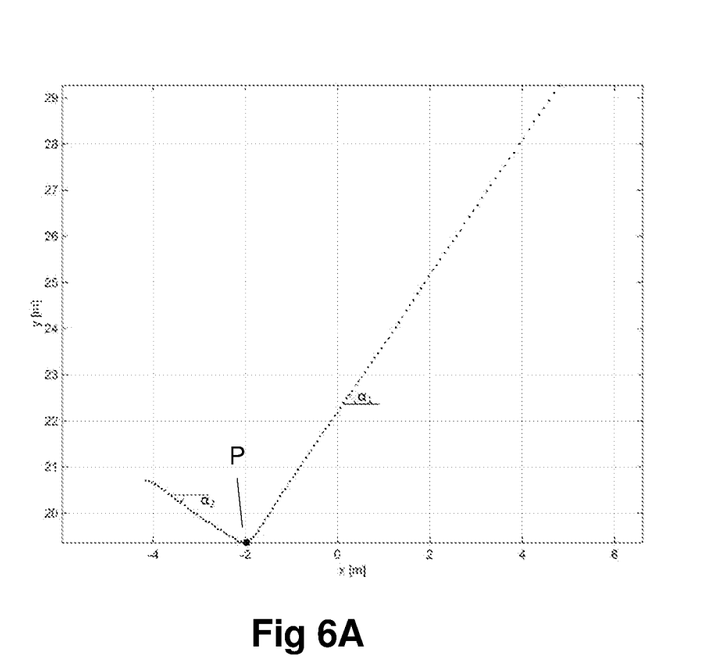
FIG. 6A shows a detail of the exemplary scan plot, wherein said scan data is prefiltered by the controller to identify an approximate trailer position from a prefiltered data set.

An example of a set of measurement points belonging to a trailer is shown in FIG. 6A, wherein typically a visibility scenario 3 is depicted. To identify which of the three cases of FIG. 5B has occurred, a line is fitted through the set of points using a least square error fitting technique. For example, as a method of fitting lines through the set of points representing one or two sides of the truck body or trailer, a template form can be used that matches the shape of this part of the vehicle. The correct position and orientation of the trailer can be found by an optimization routine that optimizes an objective function that describes how well the shape fits the point cloud for possible ways to place the template shape.

Figure 6B:
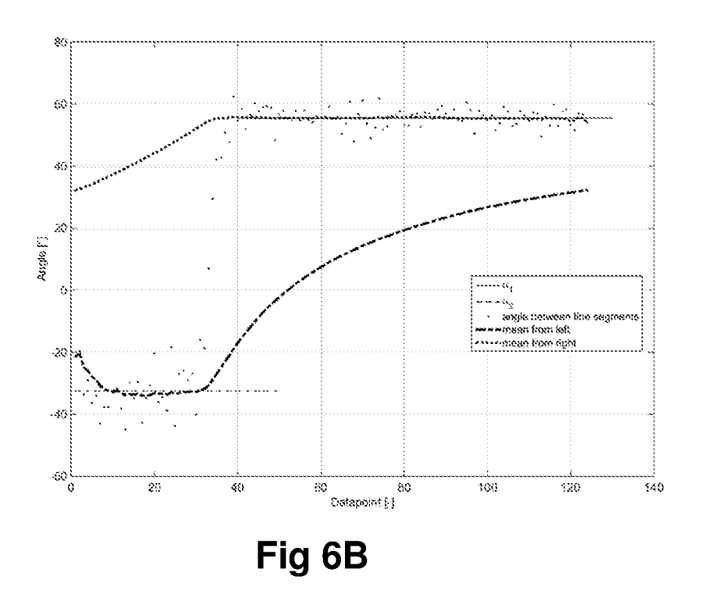
FIG. 6B shows from the exemplary scan plot two sets of mean value data points forming two corresponding line segments; set sets of data points matching one of a number of visibility scenario's of the trailer.

FIG. 6B illustrates an efficient way of calculating said corner point P by calculating for each pair of scan data elements having adjacent reflection angles, a relative angle of a line segment interconnecting said pair of scan data elements as shown in FIG. 6B. This approach circumvents many iterative processing and can advantageously be used to directly obtain the trailer orientation angle.

Then the residual (squared sum of the errors) is computed. If the residual exceeds a certain threshold, the points do not lie on a line, so multiple sides of the trailer must be visible. When the points do lie on a line, case 1 can be distinguished from case 2 based on the length of the line, or based on the previous orientation (a slow moving trailer cannot transition from case 1 to case 2 within a fraction of a second).

When the points do not lie on a line, the algorithm determines where the trailers corner point is by splitting the data set into two separate sets. A distinction is subsequently made to identify scenario 3 or 4, i.e. to subsequently identify whether the long side of the trailer is on the left or the right side. Since the line segments may be tracked in consecutive frames, their known lengths can be used, or the orientation in the previous frame (noting that the trailer cannot transition between cases 3 and 4 within a fraction of a second). Effectively this means that, during the first measurement, a sufficiently large part of the trailer has to be visible to determine where the long and short side of the trailer are, along with an indication which way the truck is facing (which cannot always be determined from the laser measurement alone). After the initial measurement, the trailer can be tracked throughout the next frames, by propagating the previous orientation and heading.

To determine the location of the corner point (or split point) for cases 3 and 4, the orientation angle (w.r.t the x-axis) of line segments connecting two adjacent data-points is used. For each side of the trailer, this angle is approximately constant ($\alpha 1$ and $\alpha 2$ in FIG. 6A). At the corner point P, a ninety degree jump occurs in the orientation. This jump can be advantageously used by determining the mean angle from the left side of the cloud of points, as well as from the right side (see FIG. 6B). For one of the sides of the trailer, the mean from the left of the array will be a good fit (approximately equal to $\alpha 1$), while for the other the mean from the right side of the array is a good fit (approximately equal to $\alpha 2$).

Figure 7A:
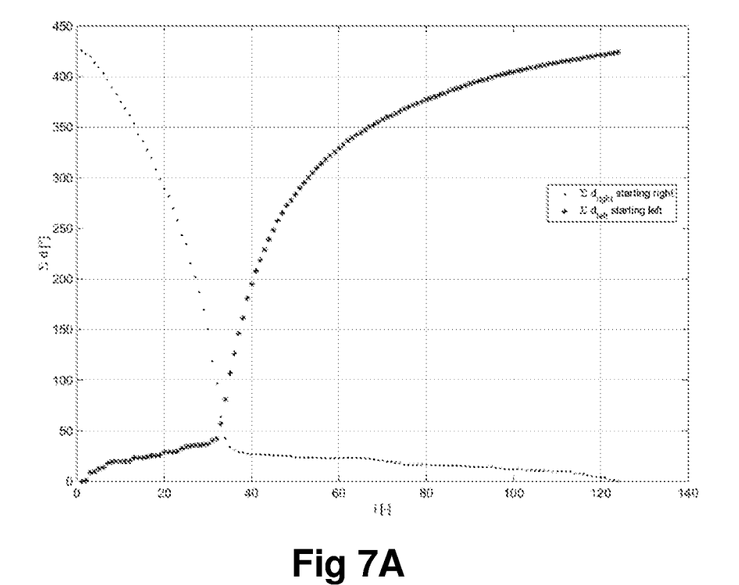
FIG. 7A shows errors deviating from first and second mean values respectively.
Figure 7B:
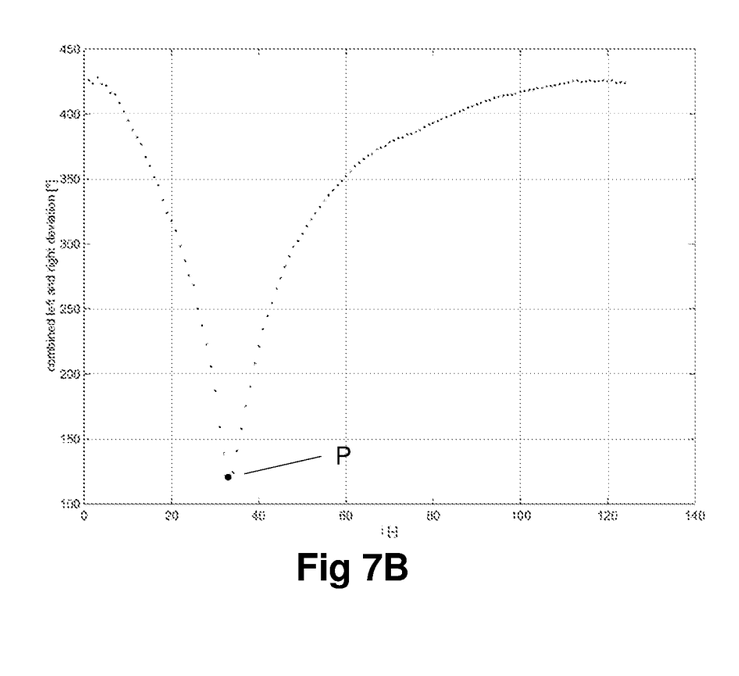
FIG. 7B shows the summed errors of FIG. 7A showing a minimum error value.

FIG. 7B shows the discrete transition between subsequent angles indicating a corner point, that can be obtained by computing the sum of absolute distances to the left mean value starting at the left side of the array, and summing the distances to the right mean value from the right side of the array (as shown in FIG. 7A). At the split point, the addition of these two signals will show a clearly distinguishable minimum at the actual corner point of the trailer as depicted in FIG. 7B, for the set of points shown in FIG. 7A. Thus, for each pair of scan data elements having adjacent reflection angles, a relative angle is calculated of a line segment interconnecting said pair of scan data elements. Accordingly a corner point is calculated from a minimum of a sum of first errors calculated from a first mean value corresponding to a first of said two respective line segments in the double set of data points and second errors calculated from a second mean value corresponding to a second of said two respective line segments in the double set of data points. That is, a subsequent reflection angle and reflection distance corresponding to the minimum error is selected to be corner point P Once the splitting point and orientation of the trailer are known, the location of the rear axle of the trailer can be determined. This position along with the newly found orientation angle are then sent to the truck for control, and then propagated to the next frame, where the trailer fitting procedure restarts.

Further Embodiments

Figure 8:
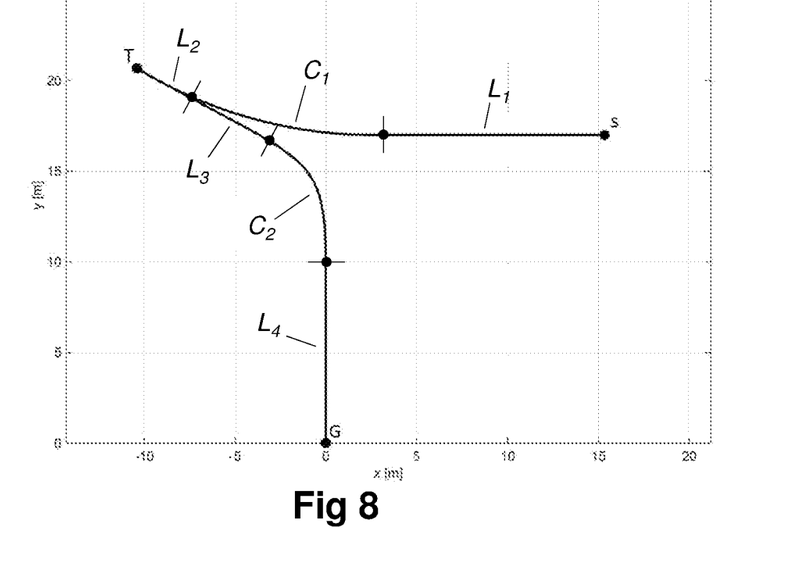
FIGS. 8-10 show exemplary planning control of planning a collision free path; and manoeuvring the truck by said docking controller according to said free path.
Figure 9:
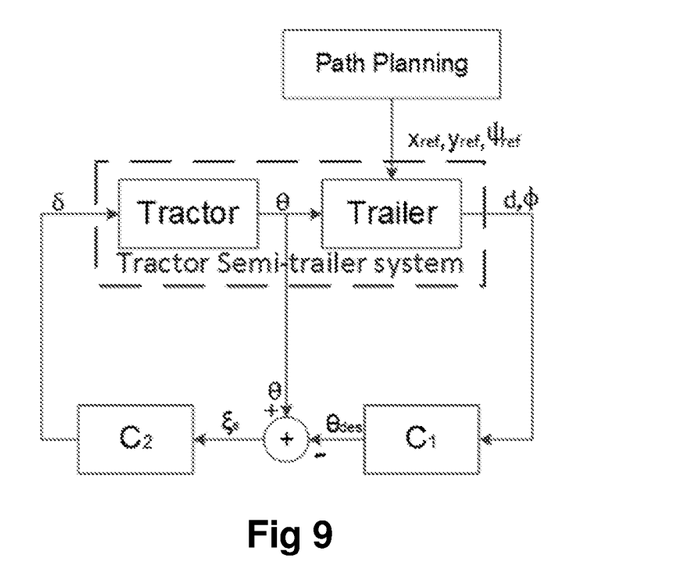
Figure 10:
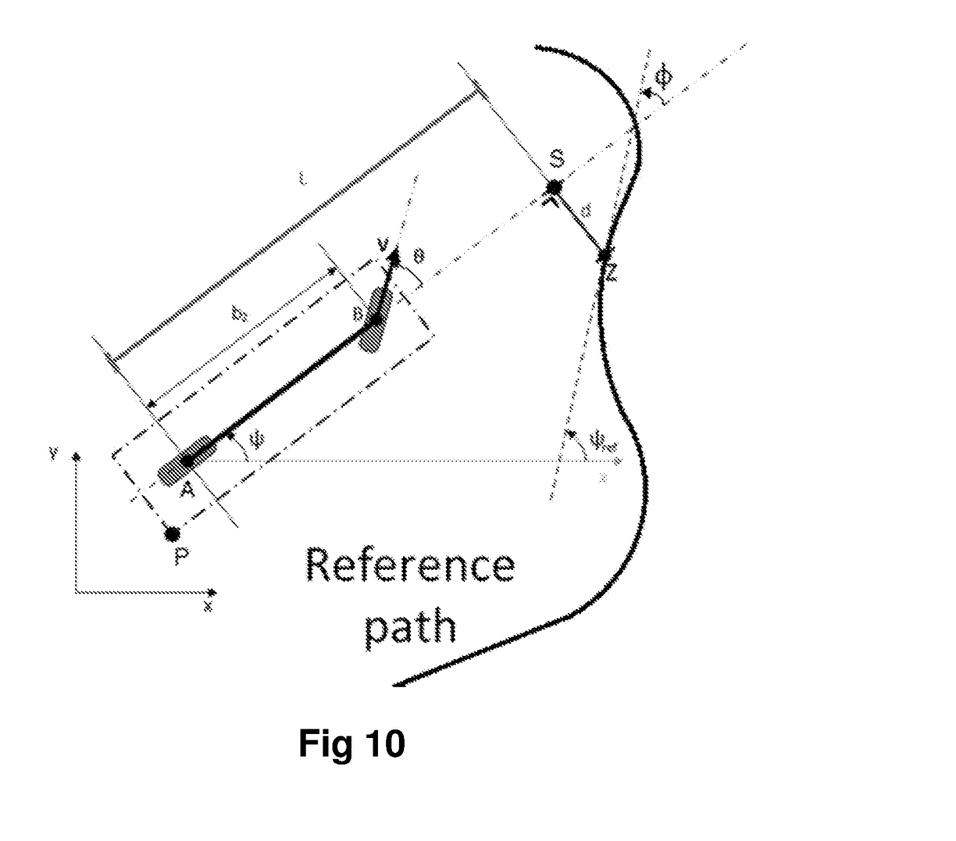

FIGS. 8, 9 and 10 show exemplary planning control of planning a collision free path; and manoeuvring the truck by said docking controller according to said free path. To plan a path that can be driven by the trailer of a trailer truck vehicle, this path has to respect the kinematic constraints of the vehicle, i.e. the limitation of motion in certain direction and a minimum turning radius.

An effective way of obtaining a feasible path in an exact formulation, is to construct this path from lines and circles, and connect these parts using so called bend and stretch maneuvers. While driving on a straight line or circle, the articulation angle of the vehicle is constant. This is known to simplify the solution to the differential equations describing the equations of motion, allowing an exact solution as mentioned in Svesta cited hereabove. Additionally, constant articulation angle means that no additional steering is required. In an embodiment, the vehicle speed is increased in segments where the articulation angle is kept constant without violating limitations in rotation speed of the steering wheel necessary to follow the path. Conversely, the vehicle speed is lowered in the interconnection phase where the articulation angle is not constant.

The most common manoeuver to dock a tractor semi-trailer truck consists of a forward driving path to a turning point, followed by reverse driving towards the dock. Such a path (describing the motion of the rear axle of the trailer) can be constructed by interconnected lines and circles, i.e. said path is formed from segments where the articulation angle is kept constant. An example of such a path is given in FIG. 8, where the starting point is indicated by S, the turning point is indicated by T and the goal position is indicated by G. In particular; the truck is maneuvered by said docking controller according to a collision free path L1, C1 . . . C2, L4 by orienting the trailer through control of the articulation angle between the trailer and the truck. The articulation angle is kept constant for each segment L1, C1 . . . L4 until a predetermined maximum deviation of the free path is determined. For tracking the trailer reference path, a cascaded control structure can be used, e.g. as shown in FIG. 9. This controller uses of the external measurement of the trailer's orientation and reference point position. An outer control loop calculates a desired trailer orientation angle θ, based on a lateral deviation (d) between a reference point S and the reference path—measured from the trailer's length axis orientation and error in trailer orientation Φ. This proposed articulation angle is then tracked in the inner control loop, by steering the front wheels of the tractor unit.

FIG. 10 shows a schematic representation of the trailer in the form of a bicycle. In this representation the trailer's rear axles are lumped together, and the tractor (truck) is represented by a steering front-wheel of the trailer.

The deviation d is calculated from a reference point S, e.g. a reference point having a fixed geometric relation relative to the corner point P that is derived from the scanner data. In the drawing it is illustrated that in the bicycle presentation, where corner point P is related with axle mid point A and look ahead point S.

The lateral deviation d and the heading error with respect to the path are observed at the look ahead point S. In an embodiment the look ahead point S is dependent on the vehicle speed. Such a look-ahead point S may improve the performance of the system in terms of stability and damping. By looking a distance L in forward or backward directions, i.e, e.g. relative to a middle rear axle while driving forward, or behind the rear axle when driving in reverse, the damping in the system is improved. Increasing the look-ahead distance further increases the damping in the system, but may also introduce corner cutting in case of a curved reference trajectory, which may provide a constraint for calculating a maximum look-ahead distance.

The invention claimed is:

1. A method for guiding of a motor vehicle on the basis of image data, toward a docking station by a docking controller coupled to a steering system, the method comprising: identifying, by the docking controller a current position of the motor vehicle; planning a collision free path between the motor vehicle and the docking station; and maneuvering the motor vehicle, comprising a trailer and a truck, by said docking controller according to said collision free path by orienting the trailer through control of an articulation angle defining a relative angle between the trailer and the truck, wherein the current position is identified using an off board vehicle scanner that is mounted in a fixed position relative to the docking station; wherein said off board vehicle scanner produces scan data signifying reflection angles and distances that are analyzed to identify a reference point of the motor vehicle and vehicle orientation, said vehicle orientation comprising an angle of the trailer with respect to the docking station; wherein said reference point and vehicle orientation are transmitted to the docking controller to update the current position, and feeding the docking controller with the reference point and vehicle orientation,
wherein said scan data is prefiltered by the docking controller to identify an approximate vehicle trailer position from a prefiltered data set; wherein the docking controller determines from the prefiltered data set a single set of data points forming a corresponding line segment; or, when an error level is exceeded, multiple sets of data points forming multiple corresponding line segments belonging to multiple mean values; and further wherein the docking controller matches said single set of data points or said multiple sets of data points to a visibility scenario selected from a number of potential visibility scenarios in which one or more sides of the trailer are visible and one or more positions of the trailer are possible.

2. The method according to claim 1, wherein said docking controller is wirelessly connected to a ware house control system controlling said off board vehicle scanner; said ware house control system configured to compute the collision free path and a timing control of the truck to autonomously drive the truck along said collision free path according to said timing control.

3. The method according to claim 1, wherein said multiple sets of data points are two sets of data points that form two corresponding line segments; from which said two line segments an intersection point is determined as said reference point.

4. The method according to claim 1, wherein said angle of the trailer with respect to the docking station is determined from said corresponding line segment or one of said multiple corresponding line segments matching a calculated length of the trailer.

5. The method according to claim 4, wherein the articulation angle is determined from said corresponding line segment or one of said multiple corresponding line segments matching said calculated length and an adjacent line segment.

6. The method according to claim 1, wherein, in said one of said number of visibility scenarios a trailer width or length are derived from a longest line segment of said multiple corresponding line segments; and said reference point is derived from a match of the prefiltered data set, using the trailer width or length as a constraint.

7. The method according to claim 1, wherein said collision free path is formed from segments in which the articulation angle is kept constant.

8. The method according to claim 7, wherein a speed of the vehicle is increased by the docking controller when the articulation angle is kept constant.

9. The method according to claim 3, wherein pairs of scan data elements are ordered according to increasing reflection angle; and a relative angle is calculated of line segments interconnecting each pair of scan data elements having adjacent reflection angles, and wherein said reference point is calculated from a minimum of a sum of first errors calculated from a first mean value corresponding to a first of said two corresponding line segments formed from said two sets of data points and second errors calculated from a second mean value corresponding to a second of said two corresponding line segments formed from said two sets of data points.

10. The method according to claim 1, wherein said off board vehicle scanner is a 2D or 3D laser scanner.

11. The method according to claim 1, wherein said off board vehicle scanner and said docking controller are in wireless communication.

12. The method according to claim 1, wherein said scan data is prefiltered by matching said scan data with a GPS coordinate of the motor vehicle.

13. The method according to claim 12, wherein said GPS coordinate is transmitted by the docking controller to the off board vehicle scanner or an off board processing unit.

14. A system for guiding of a motor vehicle on the basis of image data, toward a docking station, comprising a docking controller coupled to a steering system of the motor vehicle, said docking controller comprising program logic configured for: identifying a current position of the vehicle; planning a collision free path between the motor vehicle and the docking station; and maneuvering the motor vehicle, comprising a trailer and a truck, by said docking controller according to said collision free path by orienting the trailer through control of an articulation angle defining a relative angle between the trailer and the truck; the system further comprising an off board vehicle scanner that is mounted in a fixed position relative to the docking station; wherein said off board vehicle scanner produces scan data signifying reflection angles and distances that are analyzed to identify a reference point of the motor vehicle and a vehicle orientation, said vehicle orientation comprising an angle of the trailer with respect to the docking station; and a transmitter configured to transmit said reference point and vehicle orientation to the docking controller to update the current position, and feeding the docking controller with the reference point and vehicle orientation, wherein the program logic of the docking controller is further configured for prefiltering said scan data to identify an approximate vehicle trailer position from a prefiltered data set; and determining from the prefiltered data set a single set of data points forming a corresponding line segment; or, when an error level is exceeded, multiple sets of data points forming multiple corresponding line segments belonging to multiple mean values; the programming logic of the docking controller being further configured to match said single set of data points or said multiple sets of data points to a visibility scenario selected from a number of potential visibility scenarios in which one or more sides of the trailer are visible and one or more positions of the trailer are possible.

* * * * *